(12) United States Patent
Soell et al.

(10) Patent No.: US 6,214,478 B1
(45) Date of Patent: Apr. 10, 2001

(54) THIN-WALLED DIECASTING COMPOSED OF ALLOY AS A STRUCTURAL COMPONENT FOR AUTOMOBILE BODIES

(75) Inventors: Guido Soell, Urbach; Wolfgang Fussnegger, Tuebingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/517,575

(22) Filed: Mar. 2, 2000

Related U.S. Application Data

(62) Division of application No. 08/937,355, filed on Sep. 24, 1997, now Pat. No. 6,050,323.

(30) Foreign Application Priority Data

Sep. 24, 1996 (DE) .............................................. 196 39 052

(51) Int. Cl.⁷ ............................ B62D 21/00; B62D 25/04
(52) U.S. Cl. ...................... 428/582; 428/609; 296/203.01
(58) Field of Search .................................. 428/614, 609, 428/582; 164/111, 94, 108; 296/203.01, 203.03, 29, 30

(56) References Cited

U.S. PATENT DOCUMENTS

| | | | |
|---|---|---|---|
| 110,143 | * 12/1870 | Jeavons | 428/609 |
| 1,231,898 | * 7/1917 | Jenkins | 428/609 |
| 1,321,470 | * 11/1919 | Pack | 164/94 |
| 1,331,961 | * 2/1920 | Klocke | 428/609 |
| 1,446,274 | * 2/1923 | Roberts | 428/614 |
| 1,515,355 | * 11/1924 | Mitchell | 428/609 |
| 1,692,529 | * 11/1928 | Zagorski | 428/609 |
| 1,781,939 | * 11/1930 | Akers | 164/95 X |
| 1,891,740 | * 12/1932 | Westerman | 428/609 |
| 2,201,024 | * 5/1940 | Brown, Jr. | 164/94 |
| 2,837,799 | * 6/1958 | Priebe, Jr. et al. | 164/94 |
| 3,752,212 | * 8/1973 | Thompson | 164/94 X |
| 4,417,615 | * 11/1983 | Stockman | 164/94 |
| 4,572,269 | * 2/1986 | Ioshpa et al. | 164/94 X |
| 4,969,506 | * 11/1990 | Kolakowski et al. | 164/459 |
| 5,027,889 | * 7/1991 | Thorner et al. | 164/483 |
| 5,862,852 | * 1/1999 | Shibata et al. | 164/94 X |

FOREIGN PATENT DOCUMENTS

| | | |
|---|---|---|
| 3931194 | 3/1991 | (DE) . |
| 195 23 115 | 6/1996 | (DE) . |
| 19606806 | 8/1997 | (DE) . |
| 62-88674 | 4/1987 | (JP) . |
| 64-83346 | * 3/1989 | (JP) . |
| 6-33944 | 2/1994 | (JP) . |
| 6-172890 | 6/1994 | (JP) . |

OTHER PUBLICATIONS

"Neuzeitliche Druckgiessmaschinen für präzise, grossvolumige Druckgussteile", Giesserei–Praxis, 1966, pp. 115–119. (No Month)

\* cited by examiner

Primary Examiner—John J. Zimmerman
(74) Attorney, Agent, or Firm—Evenson, McKeown, Edwards & Lanahan, P.L.L.C.

(57) ABSTRACT

Methods for casting thin-walled structural elements made of alloy for automobile bodies using the diecasting, thixocasting, or thixoforming methods, as well as corresponding structural elements are described. In order to produce by these methods in particular body side wall parts including the A, B and C pillars, the castings are cast in several casting slices. The casting slices of a casting are cast, staggered timewise in succession using the same method and from the same alloy but in different casting molds or different parts of a casting mold. At the seams, the casting slices are cast together along a defined shapewise contour. The casting slices can be case together indirectly with interposition of a separate seam strip. However, they can also be cast onto one another, with an already cast first casting slice being placed in a second casting mold and cast together therein with the second casting slice. Complete body side wall parts are cast in three casting slices, with the seams being located in the roof and sill areas.

8 Claims, 3 Drawing Sheets

THIN-WALLED DIECASTING COMPOSED OF ALLOY AS A STRUCTURAL COMPONENT FOR AUTOMOBILE BODIES

This application is a division of application Ser. No. 08/937,355, filed Sep. 24, 1997 now U.S. Pat. No. 6,050,323.

BACKGROUND AND SUMMARY OF THE INVENTION

This application claims the priority of Germany application 196 39 052.4-24 filed in Germany on Sep. 24, 1997, the disclosure of which is expressly incorporated by reference herein.

The invention is based on cast thin-walled structural elements and on a method for manufacturing thin-walled structural elements by casting from alloy for bodies utilizing casting techniques as known for example from a paper by W. Bovensmann, "Modern Diecasting Machinery for Precise High-Volume Diecastings" in the journal Gießerei-Praxis, No. 7, 1966, pages 115 to 119.

Although only diecasting is mentioned and described in detail in this literature reference from 1966, other casting methods of different types have recently been considered as well. Mention should be made in this connection of diecasting using an evacuated diecasting mold and thixocasting as well as thixoforming. In general, this refers to a creative forming method in which a quantity of metal adjusted for the size of the workpiece is placed in a shaping tool that can be opened and closed and is made of metal, and the mold is then filled with the flowable alloy and shaped under the influence of high pressure, after which the workpiece is left to set under the influence of this pressure until the workpiece can be handled, whereupon it is removed from the mold. All of the shaping methods that can be subsumed under this definition are covered here by the term "diecasting." In this connection, mention can be made for example of the special edition of the journals ATZ and MTZ in 1996 on the topic "Alloys in Automobile Construction" with papers by B. Wendiger and A. Mundl: "Thixocasting —A Shaping Technique with a Future," or G. Springe: "The Future of the Use of Aluminum in Automobile Construction." With the proper choice and pretreatment of the pre-product with globulitic structure and exact-temperature heating of the cylinder block to be used, the casting material behaves thixotropically, in other words it can be handled carefully as a solid but begins to flow under the influence of force. In thixocasting, the partially liquefied block is placed in a piston chamber connected with the casting mold by a feed channel, from which chamber the trixotropic metal is injected into the mold under high pressure, as in diecasting, by means of a piston. In thixoforming on the other hand, the partially liquefied block is placed directly in the mold which is still open and, as in drop forging, the impressions in the die are filled with partially liquefied metal by powerful and rapid closing of the halves of the mold.

There are natural limits in this method as to the size of the castings that can be produced. Firstly, because of the high pressure required, up to 1600 bars, and because of the projected area of the surfaces of the casting mold that are wetted by metal, very considerable forces act on the casting machinery and the mold which, because of the material elasticity of the steel according to Hook's law, lead to minor yet unavoidable deformations. With increasing size of the casting mold, despite increasing reinforcement of the machine and the mold, these deformations become so great that the mold can no longer be closed cleanly and free of flash. Another natural limit to the size of the castings, especially thin-walled castings, is the maximum possible flow distance of the metal, in other words, the maximum distance that the material can flow during filling of the mold before it hardens. Despite high flow rates, at least with narrow mold cross sections, due to contact with the mold walls, cooling occurs that increases with the length of the flow path. It should be considered in this connection that at high metal flow rates, the melt does not flow in the form of a cohesive stream of liquid but is atomized into many individual droplets that are then pressed together by the high mold-filling pressure. If the melt particles have flow paths that are too long, they cool off too much and lose their ability to adhere when pressed together, so that the casting becomes porous and brittle. In casting methods of the type described here, especially diecasting, thixocasting, and thixoforming, for the reasons given above, there are limits to the size of the castings that reflect the method used but cannot be expressed in units of length because they also depend on other factors, especially the type of casting, its shape, the wall thickness, and the accuracy requirements.

The goal of the invention is to improve the structural component produced according to the species or the manufacturing method in such a way that thin-walled cast structural elements can also be manufactured using the size limits associated with the method.

This goal is achieved on the basis of the species according to the invention by providing an automobile structural element which consists of a plurality of similarly cast casting slices which each extend over a partial area of the structural element, which casting slices are connected shapewise and materialwise along their facing seams. This goal is further achieved by using a method of casting thinwalled automobile body structural elements in which a quantity of metal adjusted for the size of the casting is placed centrally into a casting mold made of metal, the flowable alloy is shaped inside the mold under the action of high pressure, and the casting is then allowed to harden under this pressure until the workpiece can be handled and removed from the mold, wherein the castings are each cast in the form of several casting slices, with the casting slices of a casting being cast staggered timewise in succession, using the same method and an at least approximately identical alloy but using different casting molds or different sections of a casting mold, said slices being cast together at their opposing seams along a predefined shapewise contour.

According to the method, the castings are cast in several casting slices manufactured in succession with a time delay, with these slices being cast together at their opposite seams along a specified contour with an integral shape.

Other objects, advantages and novel features of the present invention will become apparent from the following detailed description of the invention when considered in conjunction with the accompanying drawings.

DETAILED DESCRIPTION OF THE DRAWINGS

Figure 1:
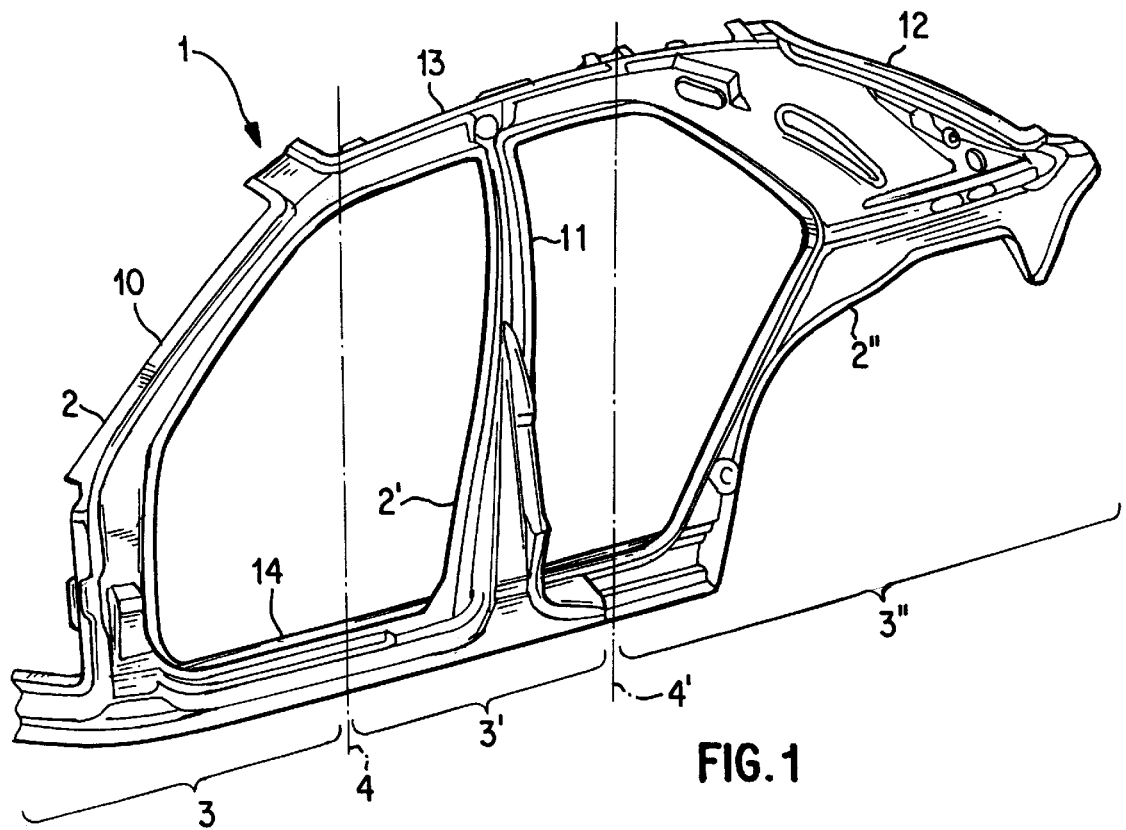
FIG. 1 is a perspective view of a diecasting to be made in a plurality of slice in a uniform diecasting tool, using the example of a side wall part for automobile bodies, according to preferred embodiments of the present invention.

Initially, with reference to FIG. 1, the diecasting to be produced as a plurality of diecast slices, the inside wall of a two-shell body side wall for example, will be explained. In this interior structural element of a complex shape that is readily manufactured by casting technology, during the manufacture of the body-in-white, an external cladding made of drawn sheet metal, preferably sheet alloy, is welded in place, so that a stable side wall structure results that is made of hollow sections, the outer shell of said structure corresponding to the outer shape of the skin of the body and capable of meeting high standards for visual appearance because of its surface shape.

Side wall part 1 contains the two door cutouts and the connections and/or node elements in adjacent beams of the vehicle body. At the bottom of the side wall part is sill 14 and at the top, roof rail 13. At the front, the driver's door opening is delimited by the side member of the windshield and the column to which the driver's door is latched, the so-called A pillar 10. Between the two doors is the center post, the so-called B pillar 11, and the rear door cutout is delimited at the rear by the wheel well and the so-called C pillar 12.

As already explained at the outset, it is very difficult to cast such large workpieces as a single casting, for which reason side wall part 1 is intended to be cast successively according to the invention in several slices. For this purpose, the side wall part is divided into a total of three areas 3, 3', and 3" in which the individual casting slices 2, 2', and 2" are located that are delimited from one another by seams 4 and 4' and are connected shapewise and materialwise at these sites. In the embodiment of a side wall part shown, these seams are located in the vicinity of the roof (13) or sill members (14).

Casting diecastings in a plurality of slices to be shaped in succession can be achieved in basically two ways, but only one of these possibilities will be discussed at the outset in connection with FIGS. 1 to 3. Admittedly, the casting slices can be cast successively in various sections of a uniform casting mold, whereby, at the section limits or seams, for fluidic separation of the individual casting areas, a seam strip 8 is defined in terms of position by FIG. 3 and is inserted in a position-stable manner into the diecasting tool which is connected shapewise and materialwise with the individual casting slices by the casting process. In this procedure, the individual casting slices 2, 2', and 2" are connected indirectly with one another by inserted seam strip 8. Because only one uniform casting tool 9 is used, handling of the workpieces is as simple as when casting is performed in a single pass.

Figure 2:
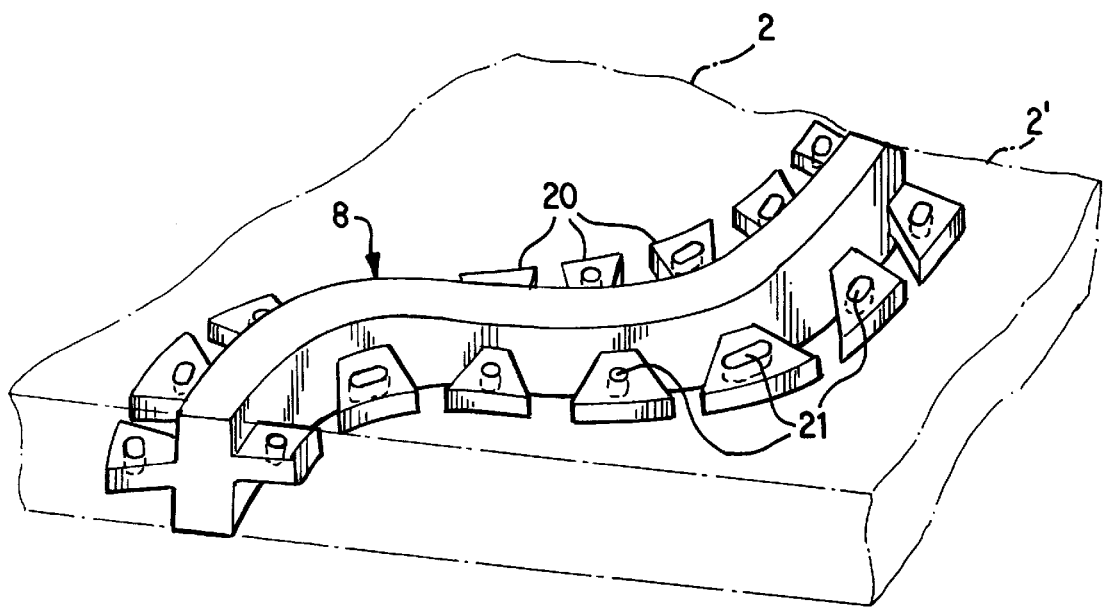
FIG. 2 is an enlarged individual view of the seam strip to be added at the seams between two casting slices adjoining one another of the diecasting of FIG. 1.

The seam strips shown individually in FIG. 2, in order to improve their connection to adjoining casting slices 2 and 2', have swallowtail-shaped projections 20 whose wall thickness is less than the wall thickness of the castings and which are overlapped U-wise by the part. The seam strip consists of the same material as the workpiece casting or of a very similar material, especially as far as the thermal expansion behavior, melting point, and strength are required. Projections 20 themselves can additionally be provided with openings 21. This produces a diverse shapewise joining of the strip material with the casting material. An additional materialwise connection of the casting workpiece to the seam strip can be favored in particular by the fact that if the seam strip is preheated to about 400 to 500° C., or if it is significantly roughened with material projections that protrude in the form of points, which constitute points for triggering melting. Due to preheating or special roughening, the seam strip melts at the surface as a result of the heat from the incoming casting melt and joins it in a materialwise connection.

Figure 3:
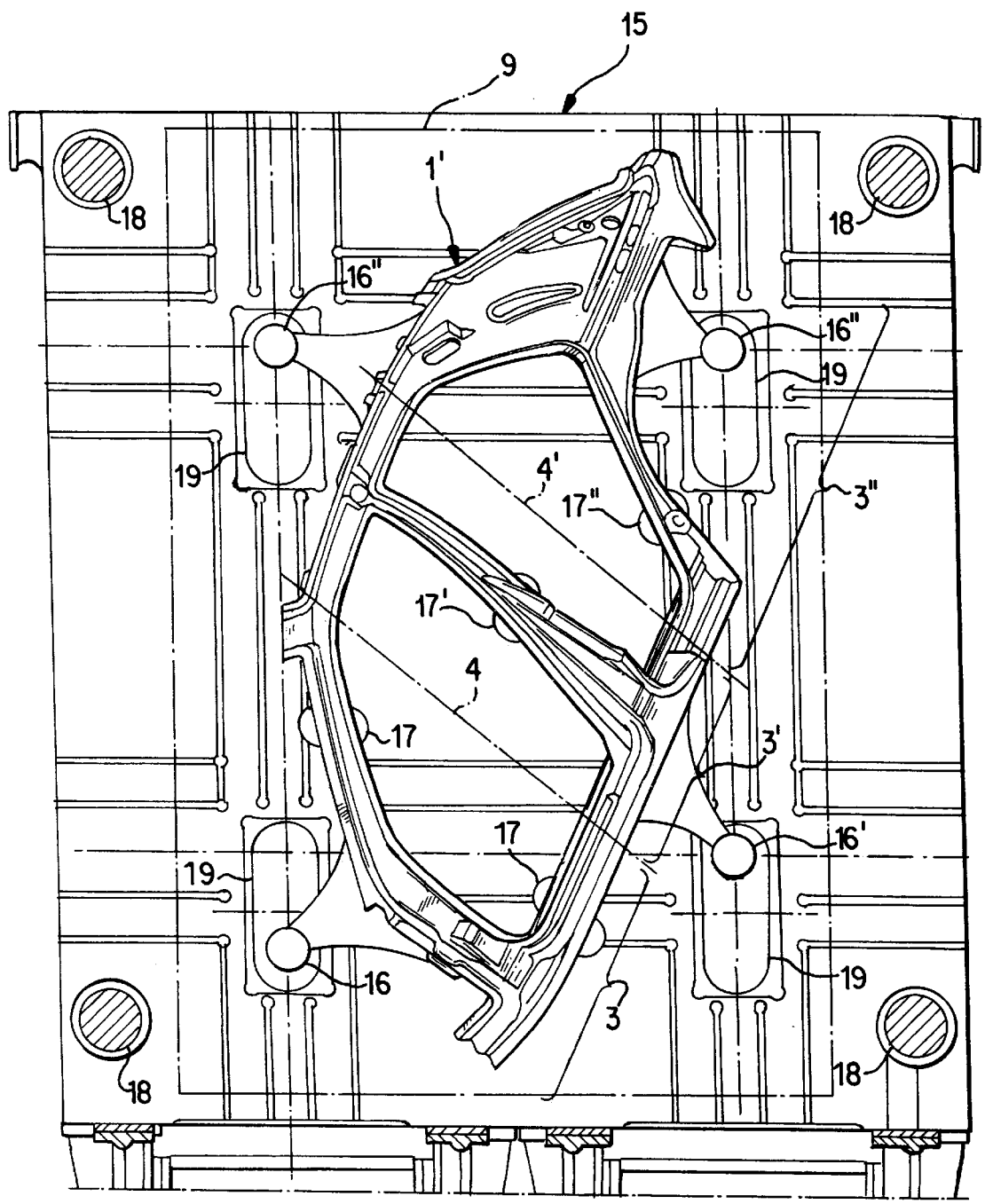
FIG. 3 is a view of a tensioning plate of a diecasting machine, with the diecasting tool indicated by the dot-dashed lines and with a blank located therein for a side wall part according to FIG. 1, showing the position of the plurality of casting cylinders to be activated on a time-staggered basis and the transitions for the individual casting slices.

FIG. 3 shows a tensioning plate 15 of a diecasting machine with diecasting tool 9 indicated by the dot-dashed lines. The tensioning plate is held in place by guide columns 18. Along these guide columns, another tensioning plate that supports the opposite counter tool can be moved between the open and closed positions of the diecasting tool. By means of guide columns 18 the closing forces to hold together the two halves are transmitted by the pressure cylinder to the diecasting machine.

For improved control over the forces that develop during diecasting, the casting is not uniformly filled and shaped over its entire length but is cast in sections at staggered time intervals and then allowed to set. For this purpose, the abovementioned division of the casting into casting areas 3, 3', and 3" along seams 4 and 4' in the roof and sill areas is provided. At these seams, for fluidic separation of the individual casting chambers, seam strips as shown in FIG. 2 must be inserted into the tool, said strips being received shapewise in matching recesses in the mold and held there in a position-defined and position-stable manner so that they cannot deflect under the high pressure of the melt. In this manner, three separate casting chambers are created in a given casting tool that can be filled in succession using diecasting technology. Thus the complete workpiece blank is cast successively and completely in casting slices at controllable closing forces.

Depending on the number of casting areas 3, 3', and 3", at least three and in the example shown, even four, casting cylinders 16, 16' and two 16" are provided, which however operate only in a time-staggered manner. Depending on the many casting areas, many transition points 17 (twice), 17', and 17" can be provided on the diecasting tool. For adaptation to local conditions and size ratios of the workpiece, casting cylinders 16, 16', and 16" are movable in elongate holes parallel to tensioning plate 9 and can be adjusted to individual required positions and secured there.

To produce a side wall part, the seam strips are placed in the diecasting tool at the seams, the tool is closed, and the mold cavity in first casting area 3 is filled by casting cylinder 16 and the workpiece is formed to the point. The melt also communicates with the toothed contour of the seam strip and there is not only a formwise but also a materialwise connection with suitable pretreatment of the seam strip. In the first casting area, the melt pressure is maintained until the melt hardens. After the piston force drops in first casting cylinder 16, another casting area, for example second casting area 3', is filled by second casting cylinder 16' and the casting pressure is maintained until the workpiece hardens. Finally, after the pressure is released in the last area cast, the last casting area 3" is filled by the two casting cylinders 16" and removed from the mold under pressure and allowed to harden. Then the complete side wall unfinished part 1' can be removed from the diecasting tool. According to another procedure, the individual casting slices can be cast in different diecasting tools. For this purpose, a number of diecasting tools and diecasting machines will be required that corresponds to the number of diecasting slices, and these are tool and machinery designs that can be controlled in terms of size and power and are theoretically conventional. In a first casting mold or diecasting machine, a first diecasting slice is cast. This first casting slice is placed in a second casting mold or diecasting machine and, when the second diecast slice is diecast, it is cast together with the latter. In this manner, a third, a fourth, etc. casting slice can be cast on. In this procedure, the casting slices are connected directly together. It is also possible initially to manufacture the two casting slices 2 and 2" that are located on either side of a middle casting slice 2" and to cast them together with the middle casting slice 2" which is cast last.

Figure 4:
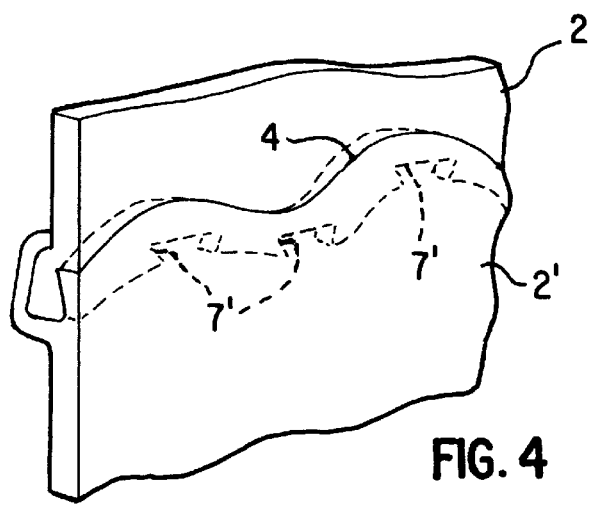
FIGS. 4 to 6 show various seam designs for a diecasting to be made in a plurality of slices in different diecasting tools.
Figure 5:
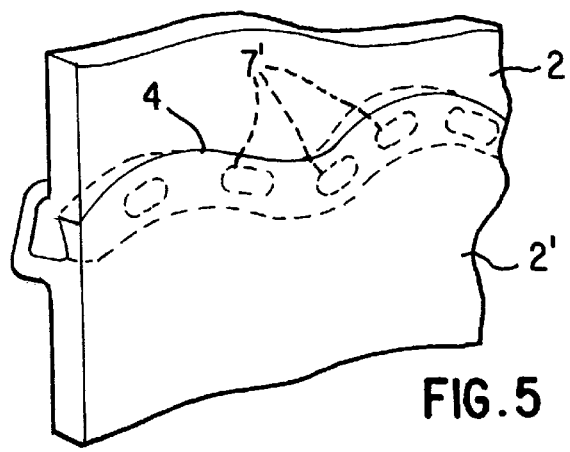
Figure 6:
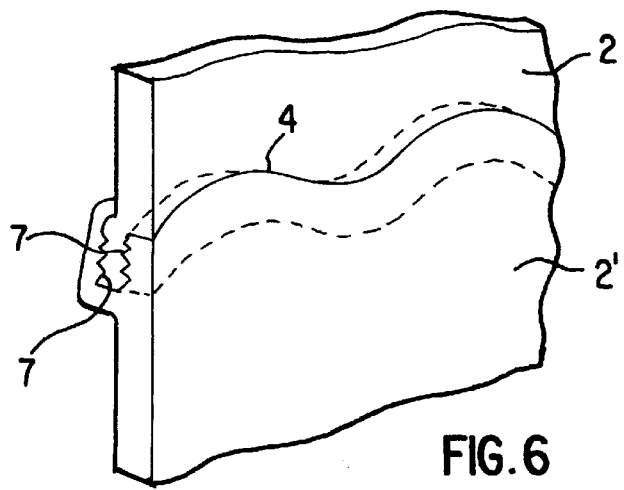

The embodiments according to FIGS. 4, 5, and 6 show how, by using this procedure and direct successive casting of the individual casting slices, a good bond between them can be created. The seam runs in a toothed or undulating fashion between the adjacent casting slices and the edge of casting slice 2' to be cast on includes the edge of the adjacent edge, swallowtail-shaped in cross section, of the adjacent previously cast casting slice 2 which is U-shaped in cross section. In addition, contour elements that operate shapewise in the form of grooves 7, holes 7', or edge cutouts 7" that taper in the shape of a swallowtail can be provided in the U-shaped edge.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A thin walled structural element, comprising:
   a plurality of similar casting slices which each extend over a partial area of the structural element and are connected to one another at respective opposing edges with an interlocking shape contour, wherein the structural element is designed as an automobile body side wall part having A, B, and C pillars.

2. The structural element of claim 1, wherein the structural element is a diecast, thixocast, or thixoformed part made of an alloy.

3. The structural element of claim 1, wherein the opposing edges extend between adjacent casting slices with a toothed or undulating shape.

4. The structural element of claim 1, wherein an edge of one of the plurality of casting slices extends around an edge of an adjacent previously cast casting slice that is U-shaped in cross-section.

5. The structural element according to claim 4, wherein the edge of the casting slice that is surrounded by the U-shaped cross-section contour elements forms grooves, openings or edge cutouts that taper in the shape of a swallowtail.

6. The cast structural element of claim 1, wherein the body side wall part is subdivided into three of said casting slices with seams each being placed in an automobile roof and a sill area.

7. A thin walled structural element, comprising:
   a plurality of similar casting slices which each extend over a partial area of the structural element and said casting slices are indirectly connected together by a seam strip, wherein the structural element is designed as an automobile body side wall part having A, B, and C pillars.

8. The structural element of claim 7, wherein the seam strip is made of the same material as the casting slices.

* * * * *